United States Patent
Sanchez (10) Patent No.: US 9,426,346 B2
(45) Date of Patent: Aug. 23, 2016

(54) COMPUTER DISPLAY VANITY LIGHTING

(71) Applicant: Jose M. Sanchez, Morgan Hill, CA (US)

(72) Inventor: Jose M. Sanchez, Morgan Hill, CA (US)

(*) Notice: Subject to any disclaimer, the term of this patent is extended or adjusted under 35 U.S.C. 154(b) by 16 days.

(21) Appl. No.: 14/598,191

(22) Filed: Jan. 15, 2015

(65) Prior Publication Data
US 2016/0212314 A1 Jul. 21, 2016

(51) Int. Cl.
| | |
|---|---|
| *H04N 7/14* | (2006.01) |
| *H04N 5/225* | (2006.01) |
| *F21V 33/00* | (2006.01) |
| *F21V 23/00* | (2015.01) |
| *F21S 10/00* | (2006.01) |
| *H04N 7/15* | (2006.01) |
| *F21Y 101/02* | (2006.01) |
| *F21W 131/30* | (2006.01) |

(52) U.S. Cl.
CPC .......... *H04N 5/2256* (2013.01); *F21S 10/00* (2013.01); *F21V 23/003* (2013.01); *F21V 33/0052* (2013.01); *H04N 7/15* (2013.01); *F21W 2131/30* (2013.01); *F21Y 2101/02* (2013.01)

(58) Field of Classification Search
CPC ...................................................... H04N 7/14
USPC .................... 348/14.01, 14.03, 14.04, 14.02
See application file for complete search history.

(56) References Cited

U.S. PATENT DOCUMENTS

| | | | |
|---|---|---|---|
| 8,432,675 B2 | 4/2013 | Lev et al. | |
| 9,007,425 B1* | 4/2015 | Simon | H04N 7/18 348/14.05 |
| 2008/0074380 A1 | 3/2008 | Owyeung | |
| 2008/0297611 A1* | 12/2008 | Qiu | H04N 5/2351 348/211.3 |
| 2013/0194775 A1* | 8/2013 | Geddes | F21V 21/30 362/11 |
| 2013/0201653 A1* | 8/2013 | Shoemake | G03B 15/02 362/3 |

OTHER PUBLICATIONS

Jose M. Sanchez, "Portable Vanity" Certificate of Copyright Notice for enclosed three sheets, Mar. 4, 2004.

* cited by examiner

*Primary Examiner* — Olisa Anwah
(74) *Attorney, Agent, or Firm* — Douglas L. Weller (57) ABSTRACT

A video camera is arranged to capture images of a user of the display. Vanity lights are arranged to produce vanity lighting that lights up the user of the display. Selection of a lighting scheme produced by the vanity lights is responsive to user selections made using the computing device.

20 Claims, 12 Drawing Sheets

000# COMPUTER DISPLAY VANITY LIGHTING

BACKGROUND

A webcam is a video camera that captures and streams images through a computer or computer network. Webcams are often used for video telephony. Many desktop computer displays, laptop computers, computer tablets and smart phones come with a built-in camera and microphone.

DESCRIPTION OF THE EMBODIMENT

To allow a user of a display to enhance their appearance as recorded by a video camera, vanity lighting can be added to the display. For example, this is accomplished by vanity lights arranged to produce vanity lighting that illuminates the user of the display. Selection of a lighting scheme produced by the vanity lights is responsive to user selections made using a computing device. A vanity light is a light placed above, below or along side of a display to illuminate a user of the display. In addition to lighting up a user, the vanity lighting can light up and subject placed before the display. In addition to the user, the subject could be a product on display or any other type of subject before the display.

Figure 1:
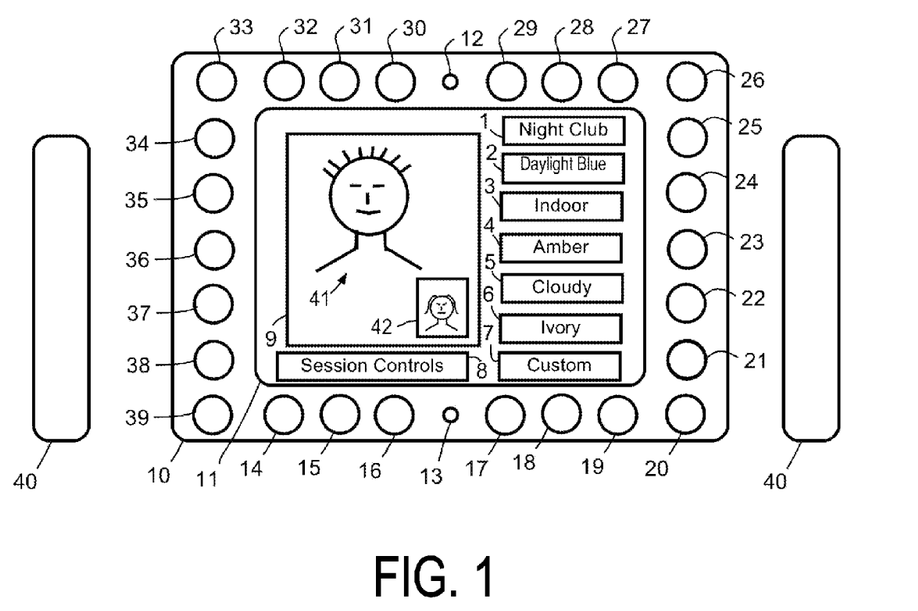
FIG. 1 illustrates vanity lighting for a computer display in accordance with an implementation.

FIG. 1 shows a computer display 10 for a computing device. For example, computer display 10 is a stand-alone computer, a computer monitor integrated with a computer, a display for a laptop computer, or a display for a handheld device such as a computer tablet or a smart phone. A display screen 11 shows text and graphics output from a computing device such as a desktop computer, a laptop computer, a tablet computer or a smart phone. The casing for display 10 incorporates a video camera 12 and a microphone 13. Alternatively, video camera 12 and microphone 13 are stand-alone. Speakers 40 can also be incorporated within the casing for display 10 or stand-alone as shown in FIG. 1.

While video camera 12 is shown as a traditional video web camera, to allow the appearance of eye-to-eye contact, a multi-lens array can be used. For example, a NanoCam™ ultra-miniature lens array 3D camera from nanoLight Technologies LLC could be arranged on casing for display 10 to produce the effect of eye-to-eye contact.

Vanity lights can be attached to display 10 or can be integrated into casing for display 10 as shown in FIG. 1. For example, FIG. 1 shows a vanity light 14, a vanity light 15, a vanity light 16, a vanity light 17, a vanity light 18, a vanity light 19, a vanity light 20, a vanity light 21, a vanity light 22, a vanity light 23, a vanity light 24, a vanity light 25, a vanity light 26, a vanity light 27, a vanity light 28, a vanity light 29, a vanity light 30, a vanity light 31, a vanity light 32, a vanity light 33, a vanity light 34, a vanity light 35, a vanity light 36, a vanity light 37, a vanity light 38 and a vanity light 39 incorporated into casing of display 10.

Vanity lights 14 through 39 can be used to produce desired lighting effects as images of the face of a user are being captured by video camera 12. For example, vanity lights 14 through 39 are each an LED light that is able to produce multiple colored lighting. Alternatively, each of vanity lights 14 through 39 produces light of only one color and different colored light schemes are accomplished by activating differently colored lights from among lights 14 through 39.

For example, in FIG. 1, a graphic user interface (GUI) for a video teleconference is displayed on display screen 11. In a window 9 is displayed a graphic 41 for an image captured by another computer video camera. A window 42 shows an image captured by video camera 12. A user of display 10 can use the image displayed in window 42 to monitor how the user appears to others engaged in the video teleconference. Session controls 8 contain menu items that can be used to control the video teleconference. The menu items can include, for example, volume control, a mute feature, video pause, vanity lighting on, vanity lighting off, and so on.

A menu button 1, a menu button 2, a menu button 3, a menu button 4, a menu button 5, a menu button 6 and a menu button 7 are used to select coloring, brightness and so on for the vanity lighting provided by vanity lights 14 through 39. Menu buttons 1 through 6, for example, each activate a predetermined lighting scheme produced by vanity lights 14 through 39. Menu button 8 brings up a custom color menu window that allows the user to adjust the color scheme produced by vanity lights 14 through 39.

Figure 2:
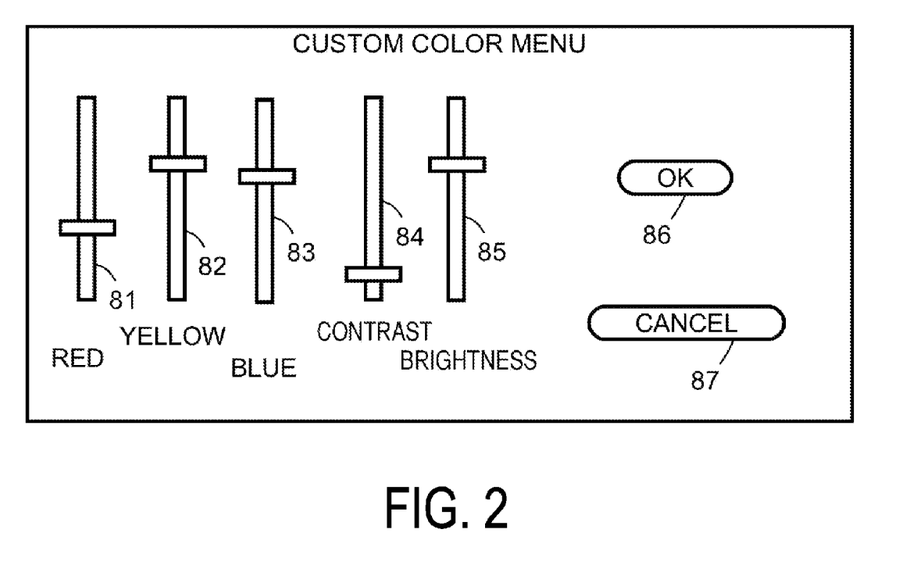
FIG. 2 shows a custom color menu window in accordance with an implementation.

FIG. 2 shows an example of a custom color menu window 80 that allows the user to adjust the color scheme produced by vanity lights 14 through 39. For example, a control 81 allows adjustment to increase or decrease red lighting. A control 82 allows adjustment to increase or decrease yellow lighting. A control 83 allows adjustment to increase or decrease blue lighting. A control 84 allows adjustment to increase or decrease color contrast. A control 85 allows adjustment to increase or decrease brightness. An OK button 86 allows a user to accept current values selected custom color menu window 80. A cancel button 87 allows a user to return without making changes to the color scheme produced by vanity lights 14 through 39.

Figure 3:
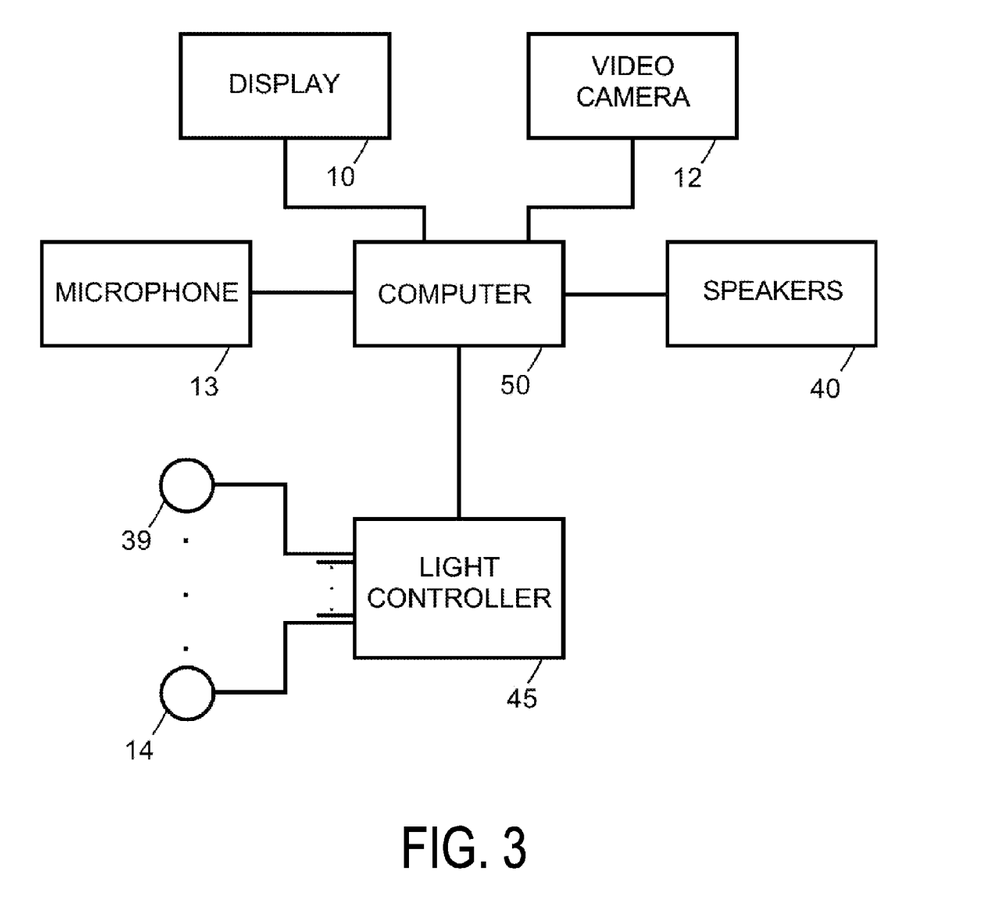
FIG. 3 is a simplified block diagram of a computer system with vanity lighting in accordance with an implementation.

FIG. 3 is a simplified block diagram showing a computer 50 connected to a display 10, a video camera 12, speakers 40 microphone 13 and a light controller 45. Light controller 45 controls vanity lights 14 through 39. For example, the interface between computer 50 and light controller 45 is a universal serial bus (USB) interface. Alternatively, another wired or wireless interface (such as Bluetooth wireless interface) can be used to connect computer 50 to light controller 45. Based on instructions from computer 50, light controller 45 turns on and off combinations of vanity lights from vanity lights 14 through 39. If each of vanity lights 14 can display more than one color, control signals from light controller 45 select which colors are displayed. When it is possible to vary intensity of light generated by individual vanity lights 14 through 39, control signals from light controller 45 indicate intensity of light emitted from each of vanity lights 14 through 39.

Figure 4:
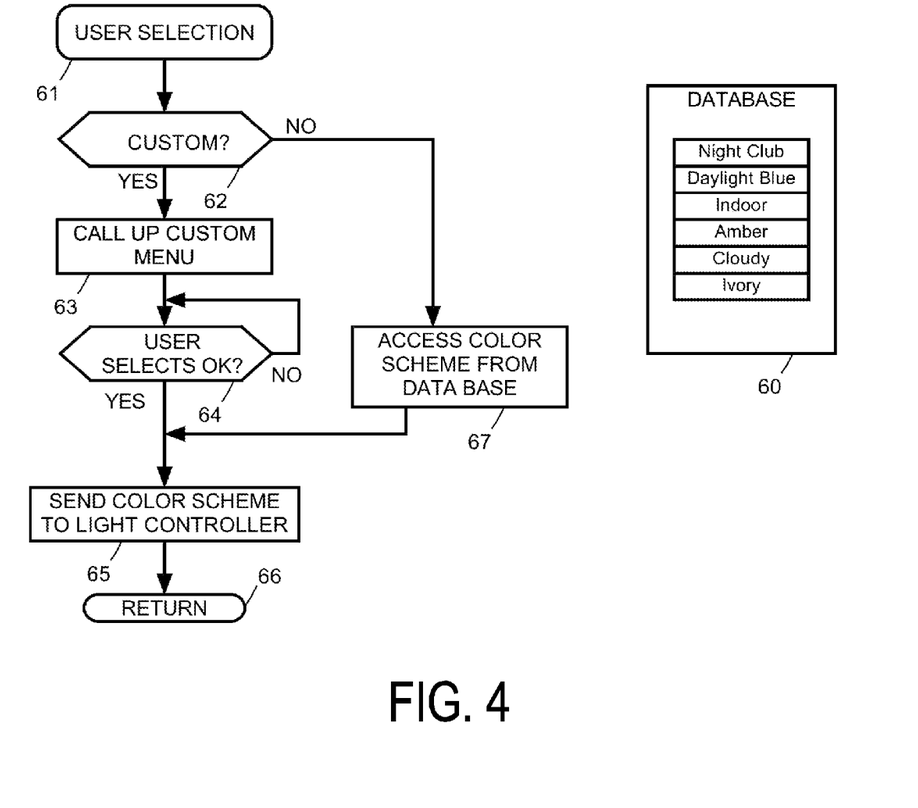
FIG. 4 is a simplified flowchart illustrating selection of vanity lighting for a computer display in accordance with an implementation.

FIG. 4 is a simplified flowchart illustrating selection of vanity lighting for a computer display in accordance with an implementation. In a block 61, a user makes a selection. For example, the user selects one of menu buttons 1 through 7. In a block 62, a check is made to see if menu button 7 for custom lighting is selected. If so, in a block 63, custom color menu window 80 is displayed to the user. The user is then allowed to adjust controls to configure custom vanity lighting. In a block 64, the logic flow waits until user selects OK button 86. When the user selects OK button 86, in a block 65, the color scheme is sent to light controller 45 for application to vanity lights 14 through 39. Then, in a block 66, logic flow returns to a calling process. Also, whenever the user selects cancel button 87 shown in FIG. 2, logic flow returns to a calling process.

If in block 62, a menu button aside from menu button 7 is selected, the color scheme is accessed from a database 60. For example, if the user selects menu button 1, then control signals for a night club lighting scheme are accessed from database 60. If the user selects menu button 2, then control signals for a daylight blue lighting scheme are accessed from database 60. If the user selects menu button 3, then control signals for an indoor lighting scheme are accessed from database 60. If the user selects menu button 4, then control signals for an amber lighting scheme are accessed from database 60. If the user selects menu button 5, then control signals for a cloudy lighting scheme are accessed from database 60. If the user selects menu button 6, then control signals for an ivory lighting scheme are accessed from database 60. In block 65, the color scheme is sent to light controller 45 for application to vanity lights 14 through 39. Then, in a block 66, logic flow returns to a calling process. The preset lighting schemes illustrated by menu buttons 1 through 6 are just exemplary. Various other preset lighting schemes could be used. For example, there could be an outdoor lighting scheme with amber lighting on the left and straw lighting on the right. There could be an outdoor lighting scheme with straw lighting on the left and amber lighting on the right. There could be different white colors, such as ivory white and silk white. There could be greeting tinting, red tinting or pink tinting to accommodate various desired ambiences. And so on.

Figure 5:
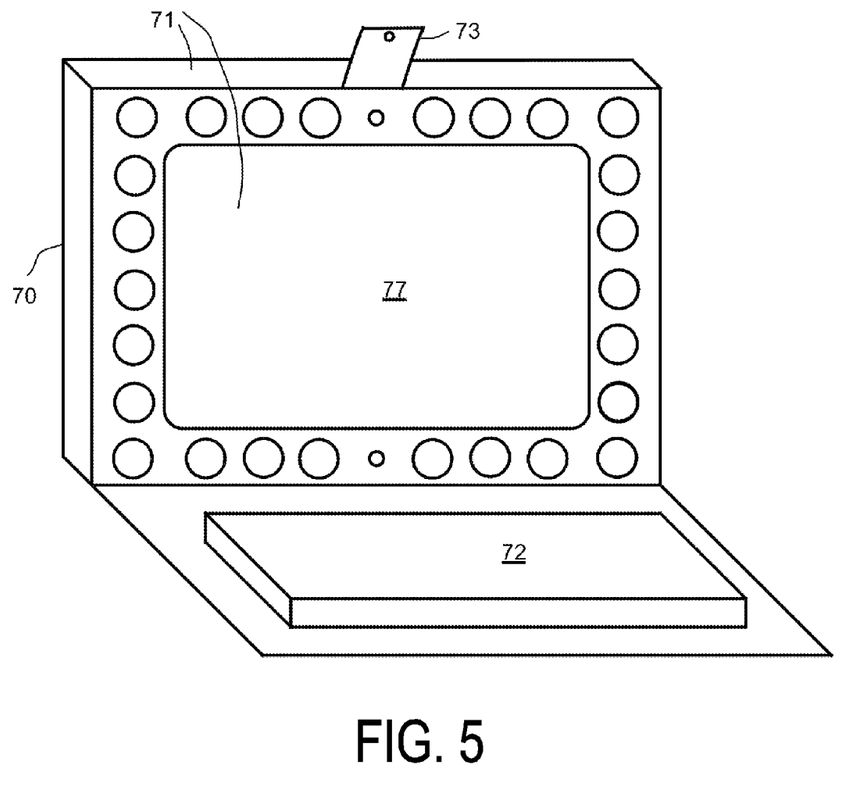
FIG. 5 and FIG. 6 are simplified diagrams illustrating vanity lighting incorporated into a case for a tablet computer in accordance with an implementation.
Figure 6:
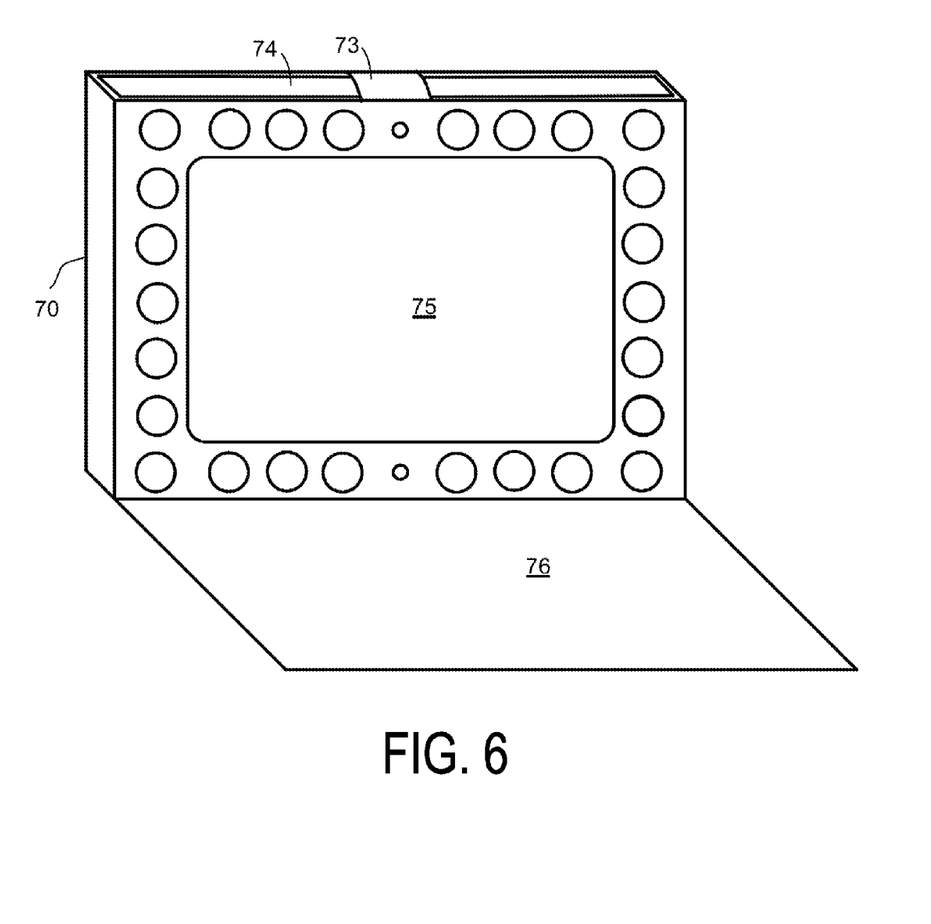

In one implementation, a mirror and/or an optional make-up tray can be used in conjunction with computer display 10 to allow a user to conveniently have access to make-up in order to enhance facial appearance. For example, a case for a tablet computer includes an attachable make-up tray, a mirror and vanity lights 14 through 39. Light controller 45 is integrated within the case and connected to the electronics of the tablet computer via a hard wire connection (such as USB) or a wireless connection (such as a Bluetooth connection). In one configuration (e.g., when the tablet computer is removed from the case) the user can use the mirror and vanity lights 14 through 39 to apply make-up. In another configuration (e.g., when the tablet computer is returned to the case and covers the mirror), the vanity lights are used to illuminate the user as images of the user are captured by video camera 12. Other features, such as a keyboard, can also be added to the case of the tablet. FIG. 5 and FIG. 6, for example, illustrate this.

In FIG. 5, a case 70 for a tablet computer includes an attachable make-up tray 72 and vanity lights. A make-up tray 62 can be attachable as shown. When there is no table computer inside case 70, a mirrored surface 71 on a backing of case 70 is visible through an opening 77. Light controller 45 is integrated within case 70 and connected to the electronics of the tablet computer via a hard wire connection (such as USB) or a wireless connection (such as a Bluetooth connection). In this configuration the user can use mirrored surface 77 when applying make-up.

In FIG. 6, a tablet computer 74 has been placed in case 70 and secured by a strap 73. Through opening 77, the user can see a screen display 75 of tablet computer 74. A bottom region 76 of case 70 can be, for example, a flat surface or contain a keyboard. In this configuration, the vanity lights can be used to illuminate the user as images of the user are captured by a video camera.

Similar cases can be designed for a smart phone or a computer laptop.

Figure 7:
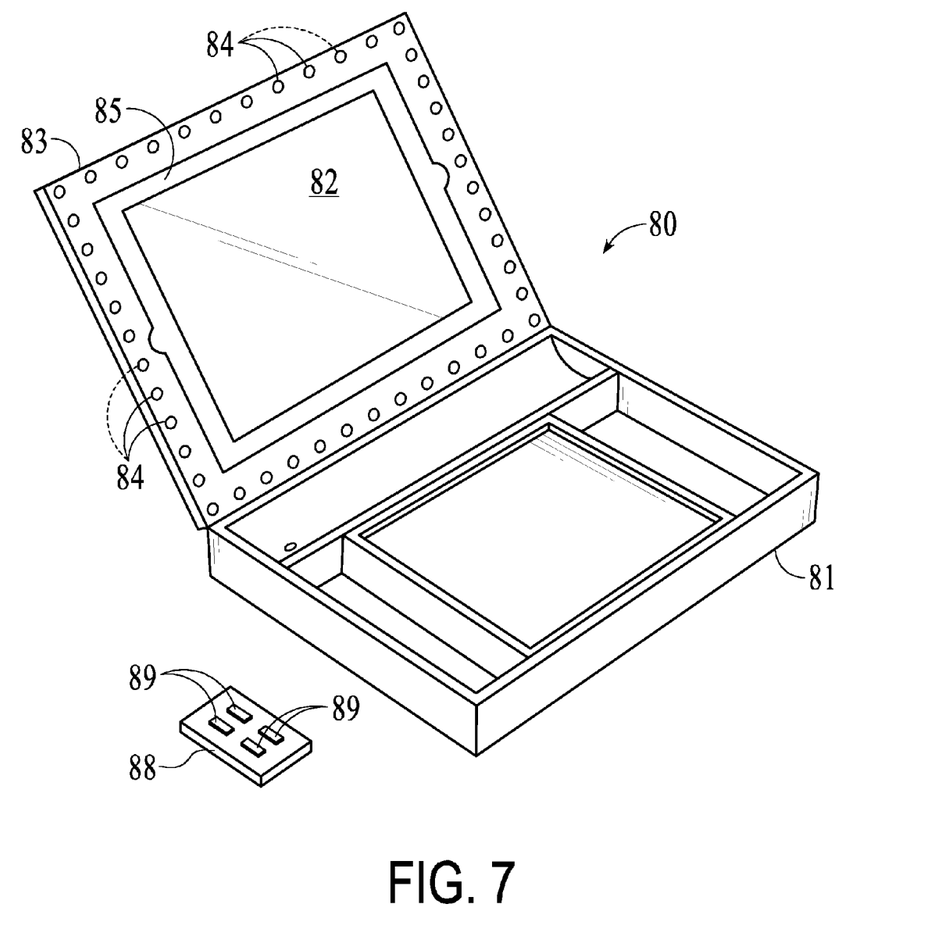
FIG. 7, FIG. 8, FIG. 9 and FIG. 10 show vanity lighting retrofit to a system that uses a computer tablet in accordance with an implementation.

FIG. 7, FIG. 8, FIG. 9 and FIG. 10 show vanity lighting retrofit to a system that uses a computer tablet. In FIG. 7, a computer tablet 85 is mounted into a frame 83 of a box 80. A screen 82 of computer tablet 85 is visible when box 80 is open. For example, a bottom 81 of box 80 can be configured to hold make-up, or some other contents. Vanity lighting 84 is controlled by computer tablet 85 or alternatively (or in addition) by a remote 88. For example buttons 89 can control, color selection, pattern selection, brightness and power on/off for vanity lighting 84.

Figure 8:
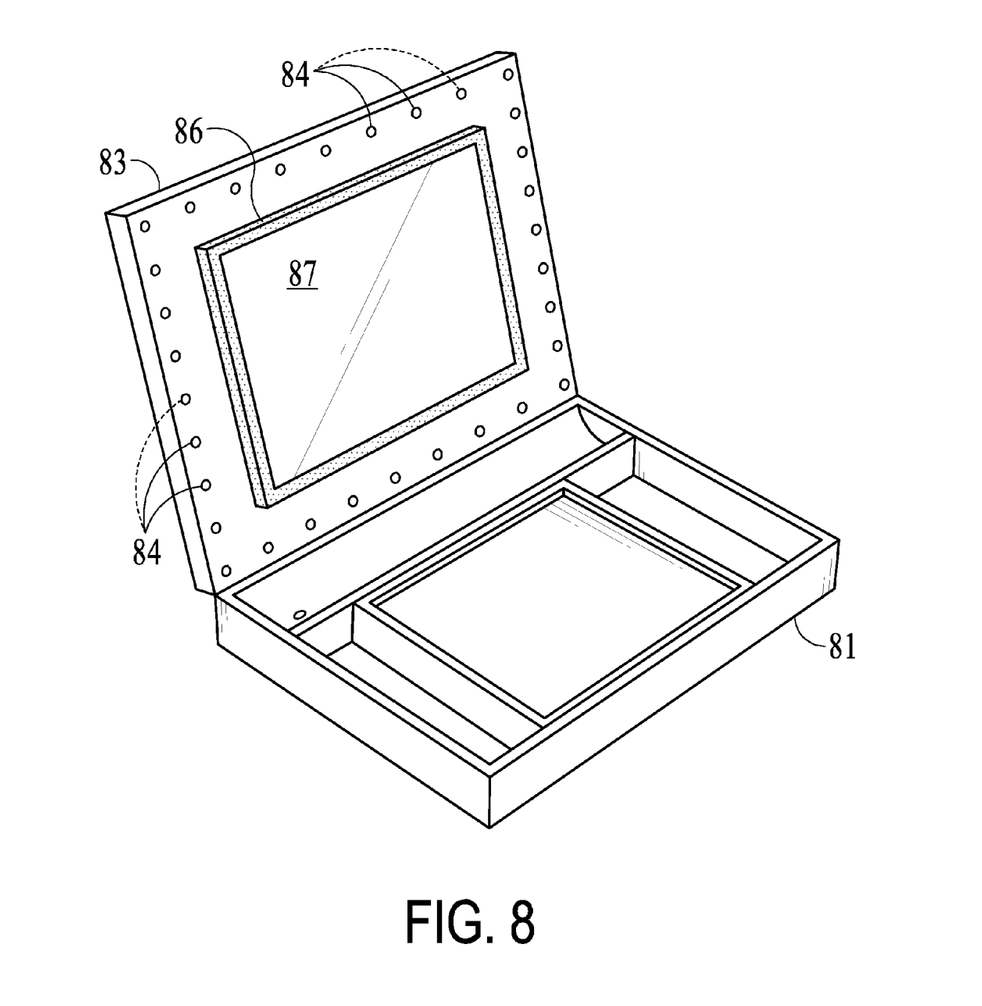
Figure 9:
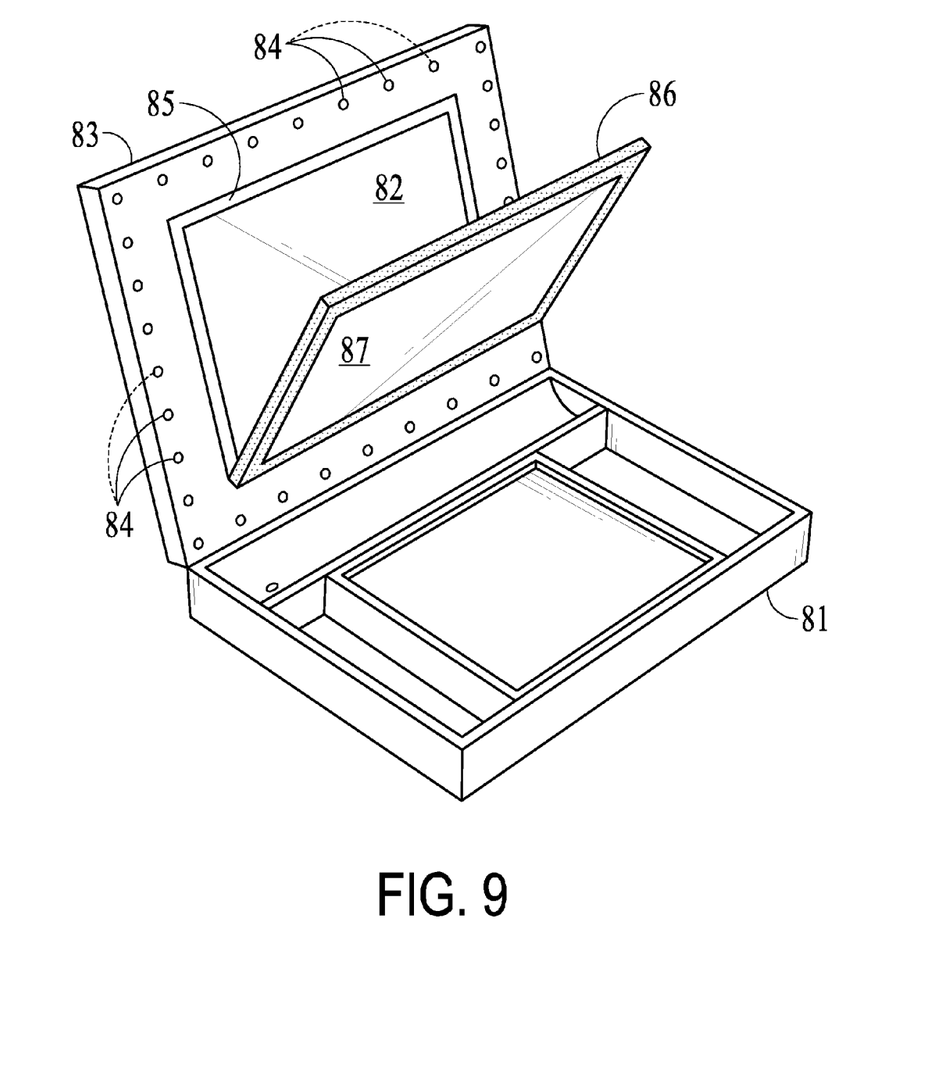

FIG. 8 shows a mirror 87 held by a mirror frame 86 that can be mounted over computer tablet 85. FIG. 9 shows how mirror and mirror frame 86 can either be folded down or detached to reveal screen 82 of computer tablet 85.

Figure 10:
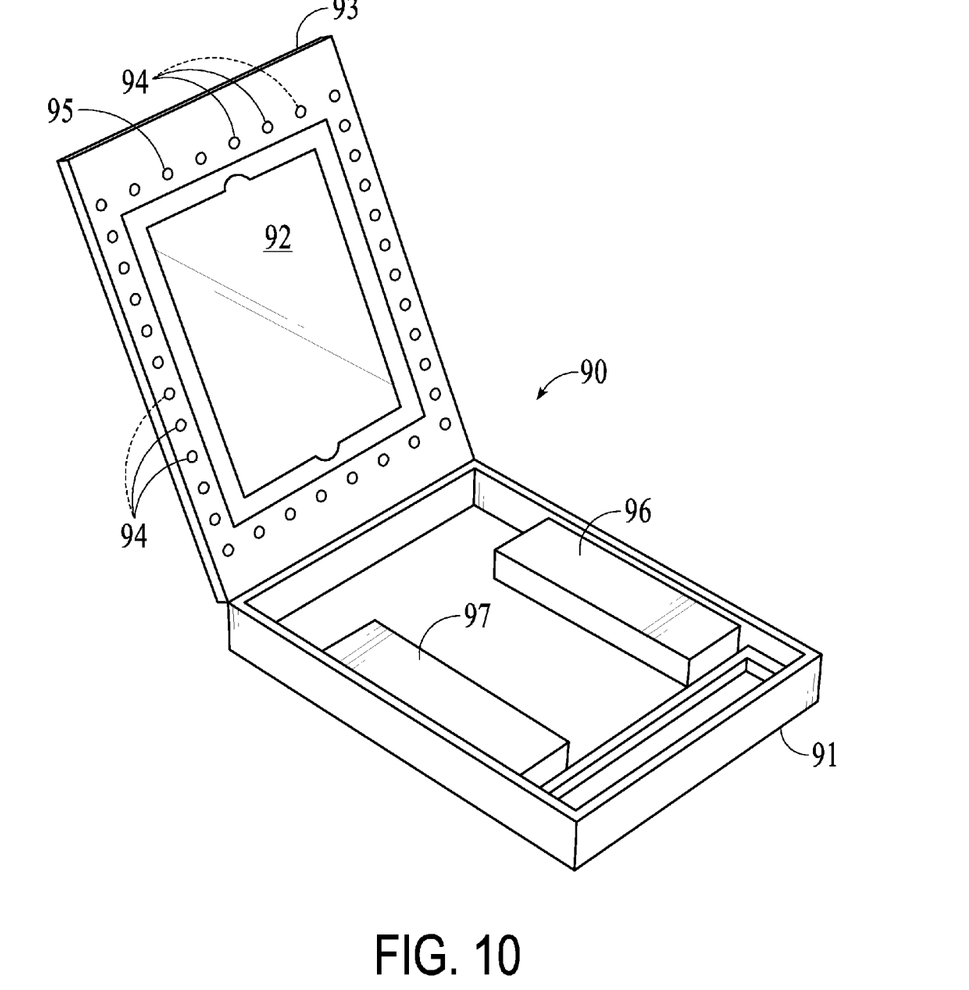

FIG. 7 and FIG. 9 show computer tablet 85 mounted on frame 83 in a landscape orientation. FIG. 10 shows vanity lighting retrofit to a system that mounts a computer tablet 95 in a portrait orientation. Specifically, in FIG. 10, computer tablet 95 is mounted into a frame 93 of a box 90. A screen 92 of computer tablet 95 is visible when box 90 is open. For example, a bottom 91 of box 90 can be configured to hold make-up, or some other contents. Box object 96 and box 97 can represent, for example, circuitry or power supply for vanity lighting 94.

Figure 11:
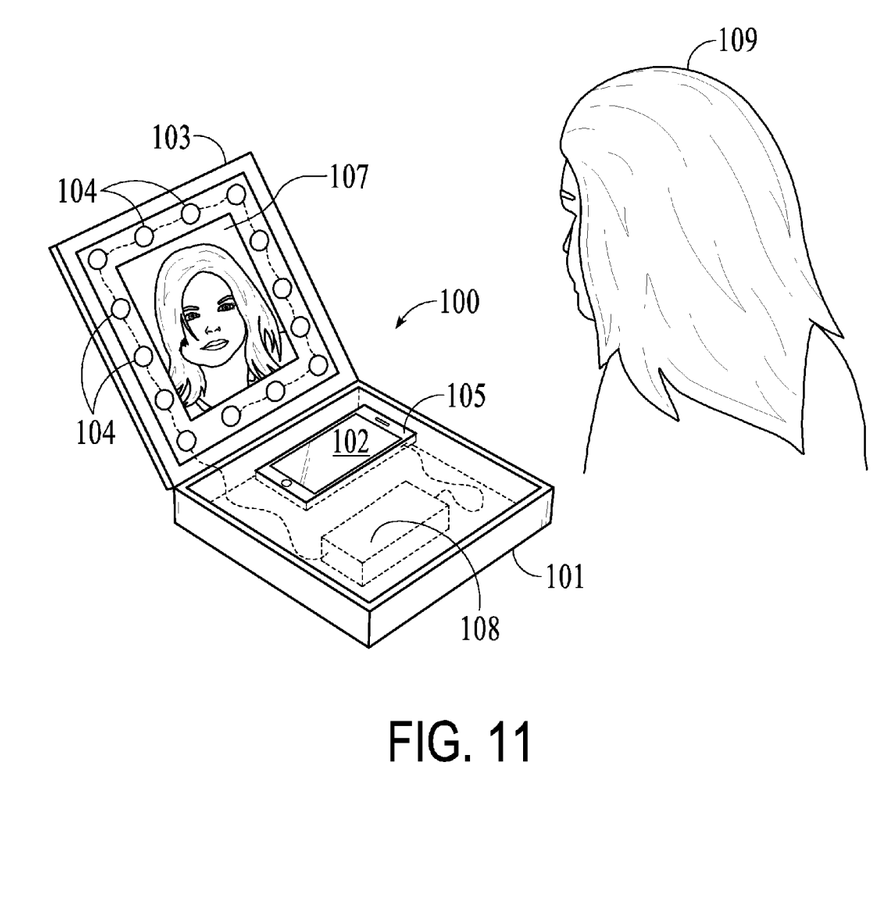
FIG. 11 and FIG. 12 show vanity lighting retrofit to a system that uses a smart phone in accordance with an implementation.
Figure 12:
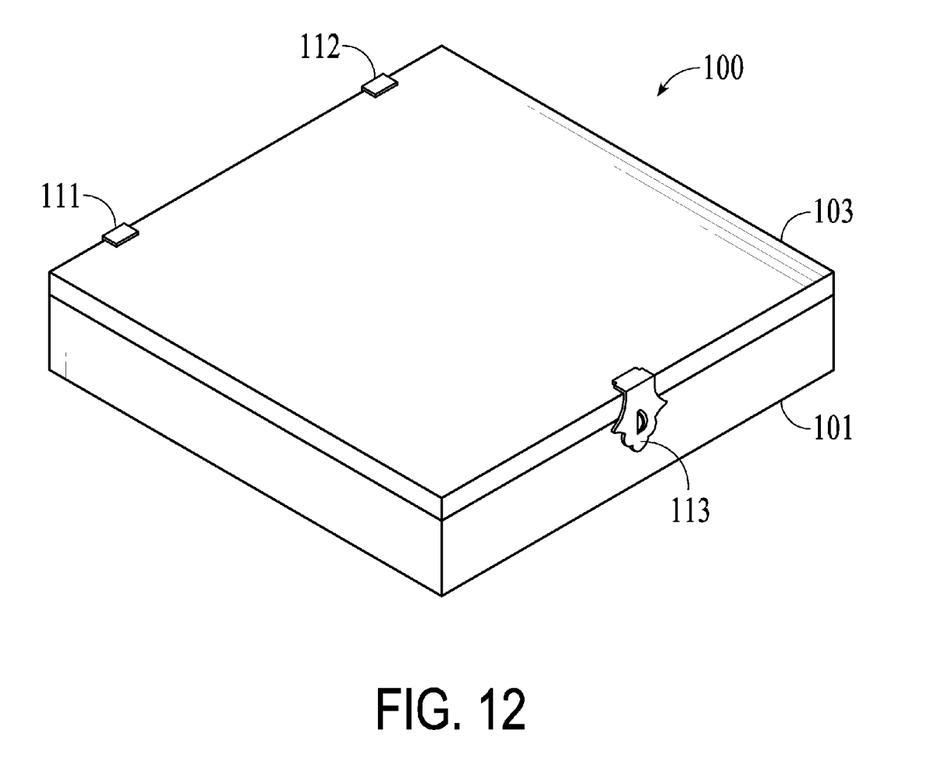

FIG. 11 and FIG. 12 show vanity lighting retrofit to a system that uses a smart phone. In FIG. 11, a smart phone 105 is mounted within a bottom 101 of box 100. A screen 102 of smart phone 85 is visible when box 100 is open. For example, bottom 101 of box 100 can be configured to hold make-up, or some other contents. Vanity lighting 104 is controlled by smart phone 105 or alternatively (or in addition) by a remote. A mirror 107 is mounted within a top 103. In FIG. 11, a reflection of the face of a user 109 is shown being reflected by mirror 107. Box shaped object 108 contains, for example, circuitry and/or power supply for vanity lighting 94.

FIG. 13 shows box 100 in a closed position. Hinges 111 and 112 as well as clasp 113 are shown securing top 103 to bottom 101 of box 100.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A device comprising:
   a box having a lid, the lid being adapted to mount a tablet computing device on a mounting area on an inside surface of the lid so that when the lid is shut the tablet computing device is hidden from sight, the tablet device computing device having a display and a video camera arranged to capture images of a user of the display; and, vanity lights arranged on a frame of the lid around the mounting area, the vanity lights being adapted to produce light that lights up the user of the display, wherein selection of a lighting scheme produced by the vanity lights is responsive to user selections made using the tablet computing device.

2. A device as in claim 1, additionally comprising:
a light controller, connected to the vanity lights and the tablet computing device, the light controller receiving control signals from the computing device and in response to the control signals producing a selected lighting scheme on the vanity lights.

3. A device as in claim 1 wherein the vanity lights comprise a plurality of light emitting diode lights arranged on the display.

4. A device as in claim 1 wherein the vanity lights comprise a plurality of light emitting diode lights incorporated within casing of the display.

5. A device as in claim 1 wherein the user selections are made with a graphics user interface displayed by the display.

6. A device as in claim 1 wherein the user selections are made with a graphics user interface displayed by the display in support of a video teleconference.

7. A device as in claim 1 wherein the video camera is incorporated within casing of the display.

8. A device as in claim 1 additionally comprising a microphone incorporated within casing of the display.

9. A device as in claim 1 wherein the box is configured to hold make-up.

10. A device as in claim 1 wherein the device includes a mirror that can be mounted over the tablet computing device.

11. A device as in claim 10 wherein the mirror includes a mirror frame that can be folded down or detached to reveal the display of the table computing.

12. A method comprising:
arranging vanity lights on a lid of a box where the lid is adapted to mount a tablet computing device on a mounting area on an inside surface of the lid so that when the lid is shut the tablet computing device is hidden from sight, the vanity lights being arranged around the mounting area and the vanity lights being adapted to produce vanity lighting that lights up a user of a display for the tablet computing device;
selecting a lighting scheme produced by the vanity lighting responsive to user selections made using the tablet computing device; and,
capturing images of the user of the display using a video camera.

13. A method as in claim 12, additionally comprising:
forwarding control signals from the tablet computing device to a light controller connected to the vanity lights; and
producing a selected lighting scheme on the vanity lights by the light controller in response to the control signals.

14. A method as in claim 12 wherein selecting the lighting scheme includes utilizing a graphics user interface displayed by the display by the user to make selections.

15. A box comprising:
a lid that is adapted to mount a tablet computing device on a mounting area on an inside surface of the lid so that when the lid is shut the tablet computing device is hidden from sight, the tablet computing device including a video camera arranged to capture images of a subject before a display of the tablet computing device; and,
vanity lights arranged around the mounting area, the vanity lights being adapted to produce vanity lighting that lights up the subject, wherein selection of a lighting scheme produced by the vanity lights is responsive to user selections made using the tablet computing device.

16. A display as in claim 15 wherein the vanity lights comprises a plurality of light emitting diode lights incorporated within the lid of the box.

17. A display as in claim 15 wherein the user selections are made with a graphics user interface displayed by the display.

18. A display as in claim 15 wherein the user selections are made with a graphics user interface displayed by the display in support of a video teleconference.

19. A display as in claim 15 additionally comprising a microphone incorporated within casing of the display.

20. A display as in claim 15 wherein the box is configured to hold make-up.

* * * * *